(12) United States Patent
Kogure (10) Patent No.: US 8,984,985 B2
(45) Date of Patent: Mar. 24, 2015

(54) STEERING APPARATUS

(71) Applicant: Showa Corporation, Gyoda-shi (JP)

(72) Inventor: Akihiro Kogure, Haga-gun (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 14/062,202

(22) Filed: Oct. 24, 2013

(65) Prior Publication Data

US 2014/0290423 A1 Oct. 2, 2014

(30) Foreign Application Priority Data

Mar. 27, 2013 (JP) .................................. 2013-066585

(51) Int. Cl.
*B62D 1/19* (2006.01)
(52) U.S. Cl.
CPC ...................................... *B62D 1/195* (2013.01)
USPC ............................................ 74/493; 280/777
(58) Field of Classification Search
CPC ............ B62D 1/11; B62D 1/19; B62D 1/192; B62D 1/195
USPC ........................................... 280/777; 74/493
See application file for complete search history.

(56) References Cited

U.S. PATENT DOCUMENTS

| | | | | | |
|---|---|---|---|---|---|
| 3,679,163 | A | * | 7/1972 | Smith | ............................ 248/548 |
| 5,356,179 | A | * | 10/1994 | Hildebrandt et al. | ......... 280/777 |
| 5,775,172 | A | * | 7/1998 | Fevre et al. | ..................... 74/492 |
| 5,944,348 | A | * | 8/1999 | Boyle et al. | .................... 280/777 |
| 6,099,036 | A | * | 8/2000 | Fujiu et al. | ..................... 280/777 |
| 6,237,955 | B1 | * | 5/2001 | Sato et al. | ..................... 280/777 |
| 7,275,767 | B2 | * | 10/2007 | Appleyard | ..................... 280/777 |
| 7,559,577 | B2 | * | 7/2009 | Oh | ................................. 280/777 |
| 7,954,852 | B2 | * | 6/2011 | Ueno et al. | ..................... 280/775 |
| 8,534,705 | B2 | * | 9/2013 | Fujiwara et al. | ............... 280/777 |
| 8,562,020 | B2 | * | 10/2013 | Arakawa et al. | ............... 280/777 |
| 8,733,793 | B2 | * | 5/2014 | Minamigata et al. | ......... 280/777 |
| 2011/0227323 | A1 | | 9/2011 | Osuka et al. | |
| 2012/0273291 | A1 | * | 11/2012 | Akutsu et al. | .................. 180/443 |
| 2012/0318092 | A1 | * | 12/2012 | Kuroumaru | ..................... 74/492 |
| 2014/0053677 | A1 | * | 2/2014 | Sakata | ............................. 74/493 |

FOREIGN PATENT DOCUMENTS

| | | |
|---|---|---|
| JP | 2011-195031 A | 10/2011 |
| JP | 2011-207450 A | 10/2011 |

* cited by examiner

*Primary Examiner* — Drew Brown
(74) *Attorney, Agent, or Firm* — Leason Ellis LLP (57) ABSTRACT

A steering apparatus includes a steering column rotating integrally with a steering wheel, a bracket supporting the steering column via a bearing in such a manner that the steering column is rotatable, and a fixation piece fixed to a vehicle body, where the bracket includes a locking hole, and during a normal state, the fixation piece is locked on a lower surface of an edge portion enclosing the locking hole thereby locking the bracket to the fixation piece, the bracket includes a pair of guided portions extending from opposing side portions of the locking hole toward the steering wheel, and during a secondary collision, the bracket moves forward to detach the fixation piece from the locking hole, and then, the fixation piece is locked on lower surfaces of the pair of guided portions, while guiding the pair of guided portions in the axial direction.

3 Claims, 12 Drawing Sheets

FIG. 11

STEERING APPARATUS

CROSS-REFERENCE TO RELATED APPLICATIONS

This application is based on and claims priority under 35 U.S.C. 119 from Japanese Patent Application No. 2013-066585 filed on Mar. 27, 2013; the entire content of which is incorporated herein by reference.

BACKGROUND

1. Technical Field

The present invention relates to a steering apparatus.

2. Related Art

A forward collision (primary collision) of a vehicle is followed by a secondary collision in which a driver collides against a steering wheel. A configuration is known which moves, during such a secondary collision, the steering wheel and a steering column move forward in order to reduce an impact load transmitted from the steering wheel to the driver.

In this configuration, when the steering wheel and the steering column move forward, the steering column and the like may fall down onto the driver's legs due to the weights of the steering column and the like. Thus, a technique has been proposed which involves mounting of a new dedicated component for preventing fall-down of the steering column and the like (see Patent Literature 1 (JP-A-2011-195031) and Patent Literature 2 (JP-A-2011-207450)).

SUMMARY OF INVENTION

However, Patent Literatures 1 and 2 include the dedicated component for preventing fall-down, increasing the number of components of the apparatus.

Thus, an object of the present invention is to provide a steering apparatus that prevents the steering column and the like from falling down during a secondary collision without increasing the number of components of the apparatus.

As means for solving the above-described problem, an aspect of the present invention provides a steering apparatus including: a steering column extending forward from a steering wheel operated by a driver, and rotating integrally with the steering wheel; a bracket supporting the steering column via a bearing in such a manner that the steering column is rotatable, the bracket being in a relative positional relation with the steering column in an axial direction; and a fixation portion fixed to a vehicle body, in which the bracket has a locking hole which penetrates the bracket in an up-down direction and which is open on a steering wheel side, the fixation portion inserted through the locking hole, during a normal state, is locked on a lower surface of an edge portion of the bracket, enclosing the locking hole thereby locking the bracket to the fixation portion, the bracket includes a pair of guided portions extending toward the steering wheel from the portions of the bracket provided at a steering wheel side of the locking hole, and during a secondary collision, the bracket moves forward to detach the fixation portion from the locking hole, and then, the fixation portion is locked on lower surfaces of the pair of guided portions, while the fixation portion guides the pair of guided portions in the axial direction.

According to such a configuration, during a secondary collision, the bracket moves forward to detach the fixation portion from the locking hole, and then, the fixation portion is locked on the lower surfaces of the pair of guided portions. This prevents the steering column and the like from falling down.

Furthermore, the fixation portion guides the pair of guided portions in the axial direction (front-rear direction), allowing the steering column and the like to move forward easily without being tilted. Thus, an axial impact load input to the steering column and the like by a secondary collision can be appropriately absorbed by an appropriate impact absorption structure. In contrast, when the steering column and the like move forward while being tilted, the impact load is difficult to absorb.

Moreover, the pair of guided portions is a part of the bracket extending from the opposite sides of the steering wheel side opening of the locking hole toward the steering wheel. This prevents an increase in the number of components of the apparatus.

Furthermore, the steering apparatus may have a configuration in which an axial length of the pair of guided portions is larger than a length in which the steering column is moved during a secondary collision.

In such a configuration, the axial length of the pair of guided portions is larger than the length by which the steering column is movable during a secondary collision. This prevents the bracket from slipping off from the fixation portion.

Furthermore, the steering apparatus may have a configuration in which the bracket includes a coupling portion that couples steering wheel sides of the pair of guided portions together.

In such a configuration, the coupling portion coupling the steering wheel sides of the pair of guided portions together functions as a stopper for the fixation portion. This prevents the bracket from slipping off from the fixation portion.

Furthermore, the steering apparatus may have a configuration in which a distance between the pair of guided portions decreases gradually toward the steering wheel.

In such a configuration, an increased frictional force is exerted between the fixation portion and the pair of guided portions, allowing the impact load that is input in the axial direction to the steering column and the like to be appropriately attenuated.

The aspect of the present invention provides a steering apparatus that prevents the steering column and the like from falling down during a secondary collision without increasing the number of components of the apparatus.

BRIEF DESCRIPTION OF DRAWINGS

FIG. 7A and FIG. 7B are diagrams of a bracket and a fixation piece according to the present embodiment during the normal state, wherein FIG. 7A is a plan view and FIG. 7B is a cross-sectional view (vertical cross-sectional view) taken along line X1-X1 in FIG. 7A;

FIG. 8A to FIG. 8C are cross-sectional views taken along line X2-X2 in FIG. 7A, wherein FIG. 8A shows the extracted bracket, FIG. 8B shows the extracted fixation piece, and FIG. 8C shows an extracted fixation piece according to a variation;

FIG. 9A and FIG. 9B are diagrams of the bracket and the fixation piece according to the present embodiment during a secondary collision, wherein FIG. 9A is a plan view and FIG. 9B is a cross-sectional view taken along line X3-X3 in FIG. 9A;

DESCRIPTION OF EMBODIMENTS

An embodiment of the present invention will be described with reference to FIG. 1 to FIG. 10.

<<Configuration of the Steering Apparatus>>

A steering apparatus 1 is an electric power steering apparatus of a column assist type.

The steering apparatus 1 includes a steering column 11 (upper shaft), an input shaft 12, a torsion bar 13, and an output shaft 14. The steering column 11 extends forward from a steering wheel (not shown in the drawings) operated by a driver and is adapted to rotate integrally with the steering wheel. That is, the steering wheel is fixed to a rear end of the steering column 11. A front end of the steering column 11 and a rear end of the input shaft 12 are coupled together by serrations or the like (see FIG. 3). The torsion bar 13 is fixed to each of the input shaft 12 and the output shaft 14 via a pin extending in a radial direction of the apparatus. The torsion bar 13 is twisted between the input shaft 12 and the output shaft 14. However, the embodiment is not limited to the fixation method using the pin, and any other fixation method may be used which is based on, for example, knurling press fit.

The steering column 11 is rotatably supported by an outer pipe 22 via a bearing 21. The bearing 21 is externally press-fitted on and fixed to the steering column 11 and is internally press-fitted on and fixed to an outer pipe 22. The steering column 11 and the outer pipe 22 have a predetermined relative positional relation in an axial direction (front-rear direction) of the apparatus. However, the fixation method is not limited to this. For example, the bearing 21 may be fitted on the steering column 11 with a gap formed between the bearing 21 and the steering column 11 and is fixed to the steering column 11 via a clip or the like.

A front end of the input shaft 12 is rotatably supported by a rear housing 42 via a bearing 31. The output shaft 14 is rotatably supported by a front housing 41 via a bearing 32. A worm wheel 50 is fixed to the output shaft 14. The worm wheel 50 includes core metal 51 fixed to the output shaft 14 and a gear tooth 52 fixed to the core metal 51. The gear tooth 52 is meshed with a worm (not shown in the drawings) rotated by an electric motor 53 that generates an auxiliary force.

A cylindrical cover 43 that protects the input shaft 12 is fixed to a rear side of the rear housing 42. A front end of the output shaft 14 is connected to a pinion shaft via a universal joint, and the pinion shaft is connected to a rack shaft via a rack and pinion mechanism.

The steering apparatus 1 includes a bracket 60 (upper bracket) and a fixation piece 70 (fixation portion) allowing the bracket 60 to be fixed to the vehicle body.

<Bracket>

The bracket 60 allows an outer pipe 22 (a rear upper side portion of the steering apparatus 1, an upper portion) to be fixed to the vehicle body and is fixed to the outer pipe 22 via an adapter 23. Thus, the bracket 60 has a predetermined relative positional relation with the steering column 11 in the axial direction. During a secondary collision, the steering column 11, the outer pipe 22, and the bracket 60 move integrally forward (see FIG. 4).

However, the bracket 60 may avoid including the adapter 23 and may be fixed directly to the outer pipe 22.

The bracket 60 includes a base portion 61 which is inversely U shaped in an axial view (as viewed in the front-rear direction) and which is fixed to the adapter 23, a pair of flange portions 62 extending outward in a vehicle width direction from a lower left end and a lower right end, respectively, of the base portion 61, and a pair of guided portions 63 extending from each flange portion 62 toward the steering wheel, located at the rear of the flange portion 62. That is, the bracket 60 is an integrally molded plate-like component and includes the base portion 61, the pair of flange portions 62, and the four guided portions 63.

<Bracket—Flange Portion>

Each flange portion 62 includes a locking hole 62a which penetrates the flange portion 62 in an up-down direction and which is open on a rear side (steering wheel side) (see FIG. 7A and FIG. 7B and FIG. 9A and FIG. 9B). The locking hole 62a is a hole through which the fixation piece 70 is inserted from the rear of the locking hole 62a. In a normal state, the inserted fixation piece 70 is locked on lower surfaces 62c of edge portions 62b of the flange portion 62, that enclose the locking hole 62a in the direction of a vehicle width. Thus, the fixation piece 70 locks the flange portion 62 in the up-down direction.

Furthermore, the locking hole 62a is shaped, in a planar view, substantially like a triangle with a vertex on a front side thereof, with the width of the locking hole 62a gradually increasing rearward.

<Bracket—Guided Portions>

The pair of guided portions 63 are elongate plate-like portions extending rearward from the opposite side portions 62d of the rear side opening of the locking hole 62a. During a secondary collision, the guided portions 63 are locked by the fixation piece 70 detached from the locking hole 62a, while the guide portions 63 are guided by the fixation piece 70 in the axial direction.

The axial length L1 of the guided portion 63 is set larger than a length by which the steering column 11 is moved during a secondary collision. More specifically, the axial length L1 of the guided portion 63 is set larger than a maximum length L2 by which the steering column 11 is moved during the secondary collision (see FIG. 1 and FIG. 3). This prevents the guided portion 63 from slipping off from the fixation piece 70. The maximum length L2 by which the steering column 11 is moved according to the present embodiment is the distance from a front end of the outer pipe 22 during the normal state and a step portion of the rear housing 42 against which the outer pipe 22 collides during a secondary collision (see FIG. 1 to FIG. 4).

<Fixation Piece>

The fixation piece 70 is a thin plate-like component which is shaped like a rectangle in a planar view and which includes an attachment hole 70a formed in the center of the fixation piece 70. The attachment hole 70a is a hole through which a bolt (not shown in the drawings) for attaching the fixation piece 70 to the vehicle body (a steering hanger and the like) is inserted. That is, the fixation piece 70 thus fixed to the vehicle body by the bolt is prevented from moving during the normal state and during a secondary collision.

Figure 8A:
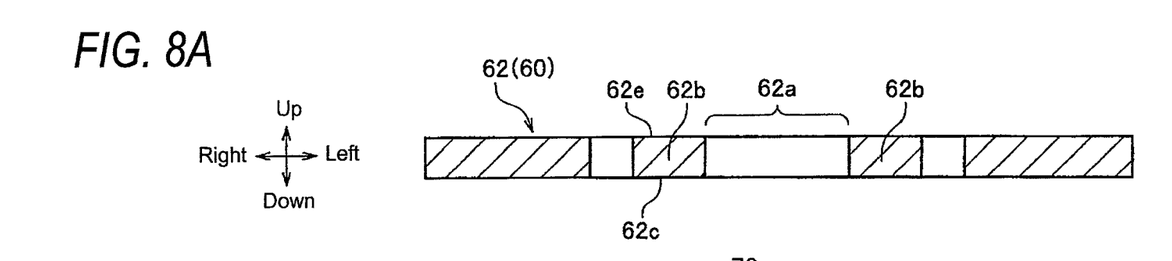
Figure 8B:
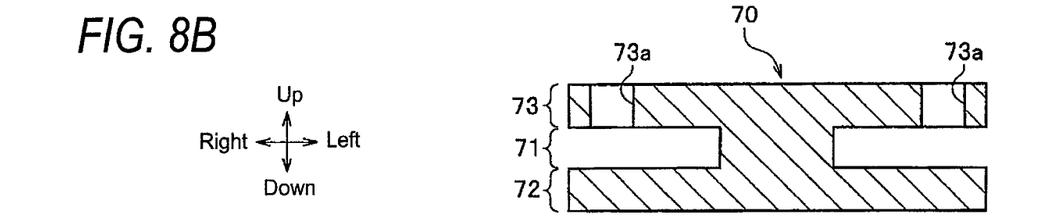

The fixation piece 70 is substantially laterally-facing H shaped in a front-rear cross-sectional view (in an axial cross-sectional view) (see FIG. 8B). The fixation piece 70 includes a inserted portion 71 that is located in the center thereof in the up-down direction, a first locking portion 72 formed under the inserted portion 71 so as to be elongate in a lateral direction, and a second locking portion 73 formed over the inserted portion 71 so as to be elongate in the lateral direction.

<Fixation Piece—Inserted Portion>

The inserted portion 71 is inserted through the locking hole 62a from the rear of the locking hole 62a. The inserted portion 71 is shaped, in a planar view, substantially like a triangle with a vertex on a front side thereof, with the width of the inserted portion 71 gradually increasing rearward, like the locking hole 62a.

<Fixation Piece—First Fixation Portion>

Figure 9A:
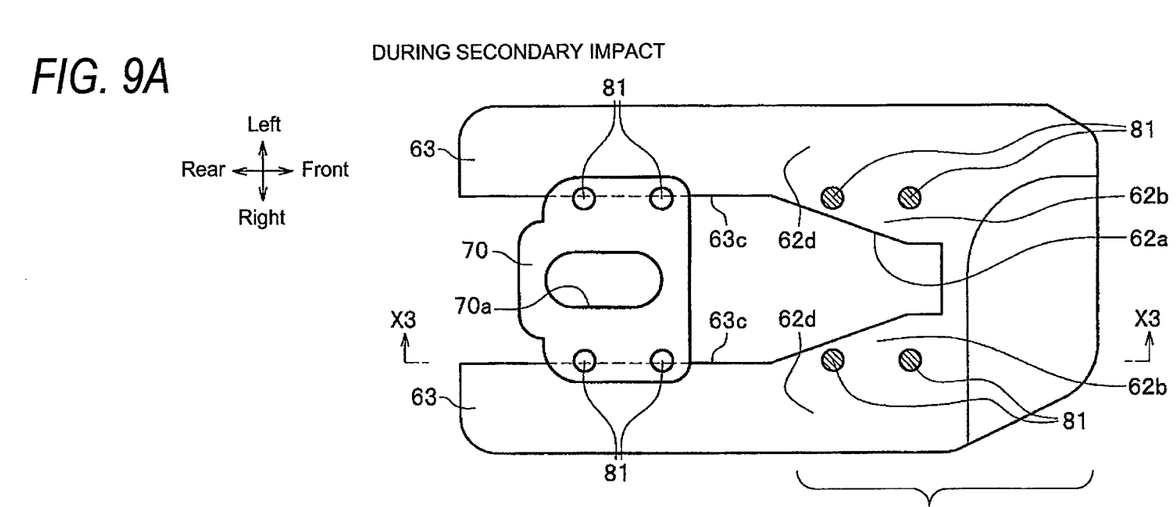
Figure 9B:
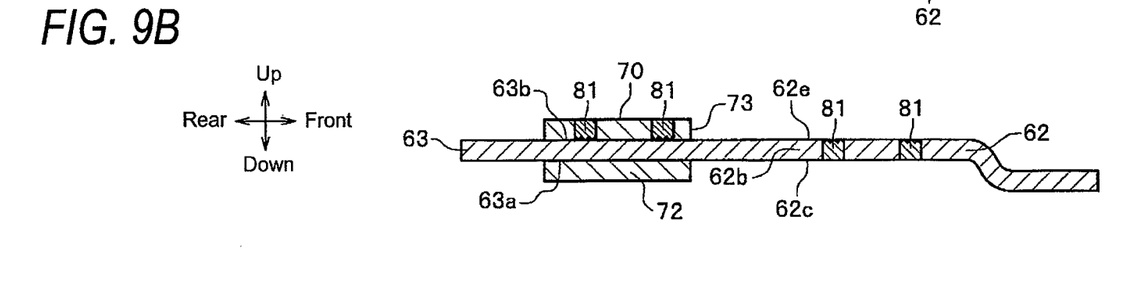

The first locking portion 72 is locked on a lower surface 62c of the flange portion 62 during the normal state (see FIG. 7B) and is locked on and in sliding contact with a lower surface 63a of the guided portion 63 to guide the guided portion 63 in the front-rear direction in a case of a secondary collision (see FIG. 9B). Thus, the first locking portion 72 is locked on the lower surface 62c and the lower surface 63a to support the bracket 60 (the steering column 11 and the like) from below to prevent the bracket 60 from falling down.

<Fixation Piece—Second Fixation Portion>

The second locking portion 73 is locked on an upper surface 62e of the flange portion 62 during the normal state (see FIG. 7B) and is locked on and in sliding contact with an upper surface 63b of the guided portion 63 during a secondary collision (see FIG. 9B). Thus, the second locking portion 73 is locked on the upper surface 62e and the upper surface 63b to prevent the bracket 60 from moving upward.

That is, the first locking portion 72 and the second locking portion 73 sandwich the flange portion 62 and the guided portions 63 in the up-down direction. Thus, the bracket 60 is regulated in the up-down direction both during the normal state (see FIG. 7B) and during a secondary collision (see FIG. 9B).

Figure 1:
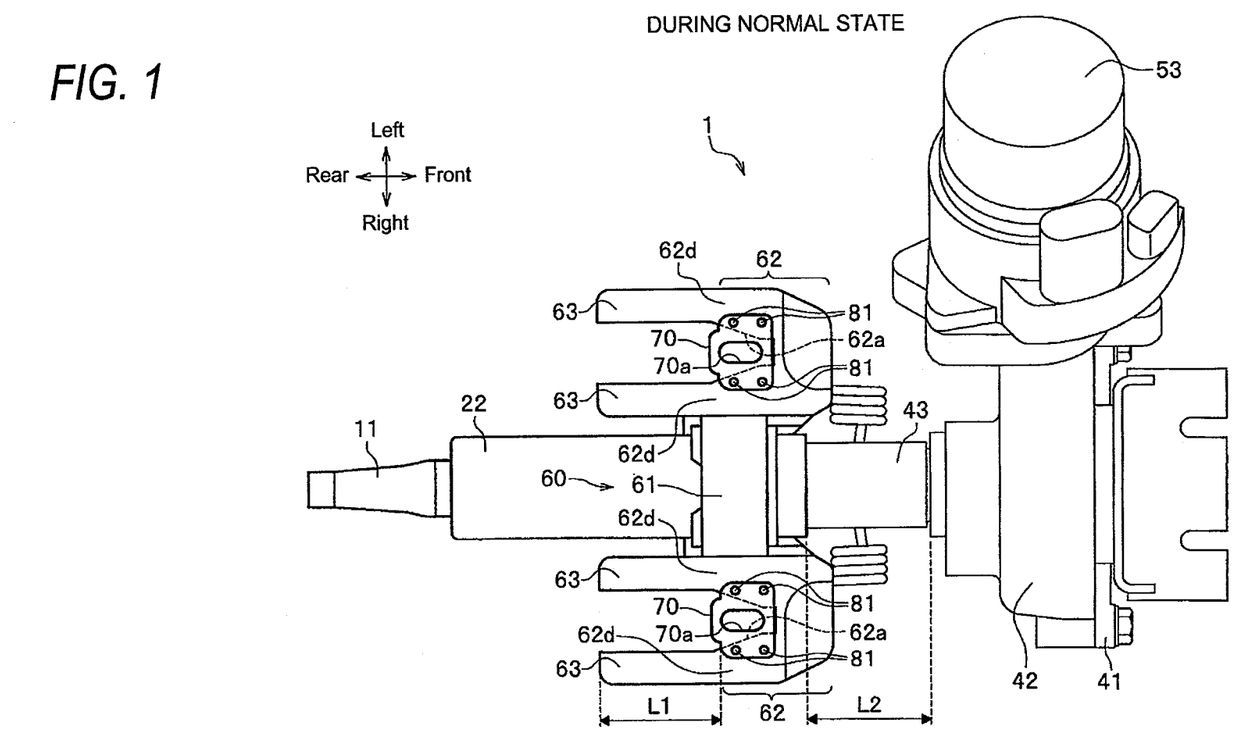
FIG. 1 is a plan view of a steering apparatus according to the present embodiment, showing a normal state.
Figure 2:
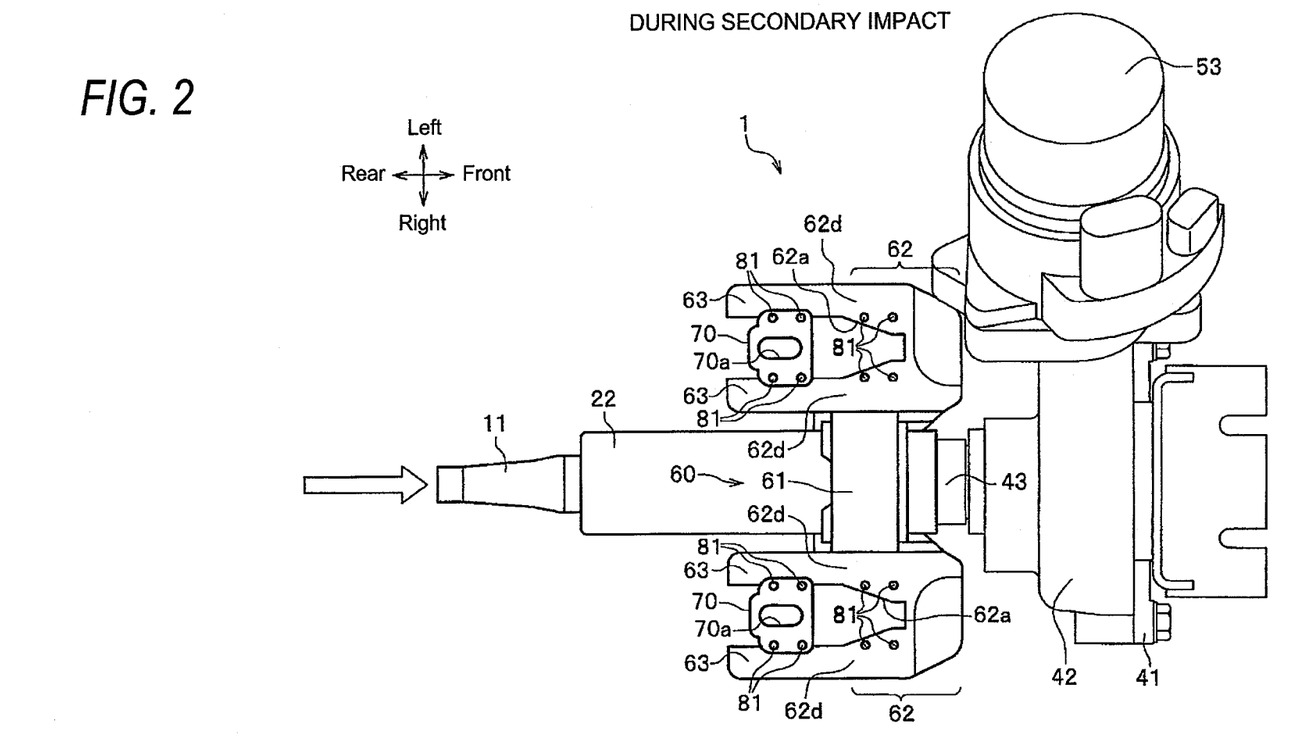
FIG. 2 is a plan view of the steering apparatus according to the present embodiment, showing a secondary collision state.
Figure 3:
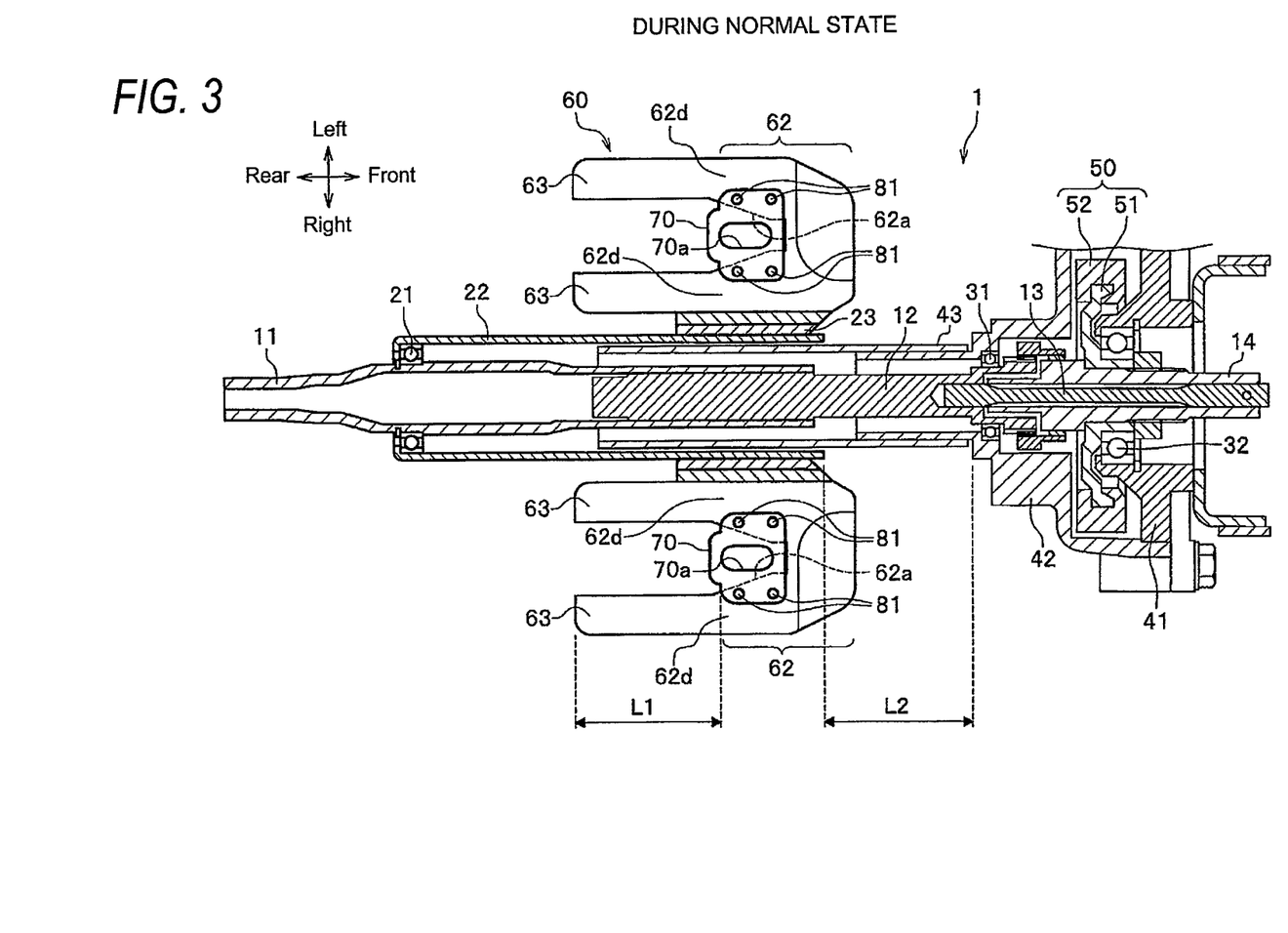
FIG. 3 is a plan cross-sectional view of the steering apparatus according to the present embodiment, showing the normal state.
Figure 4:
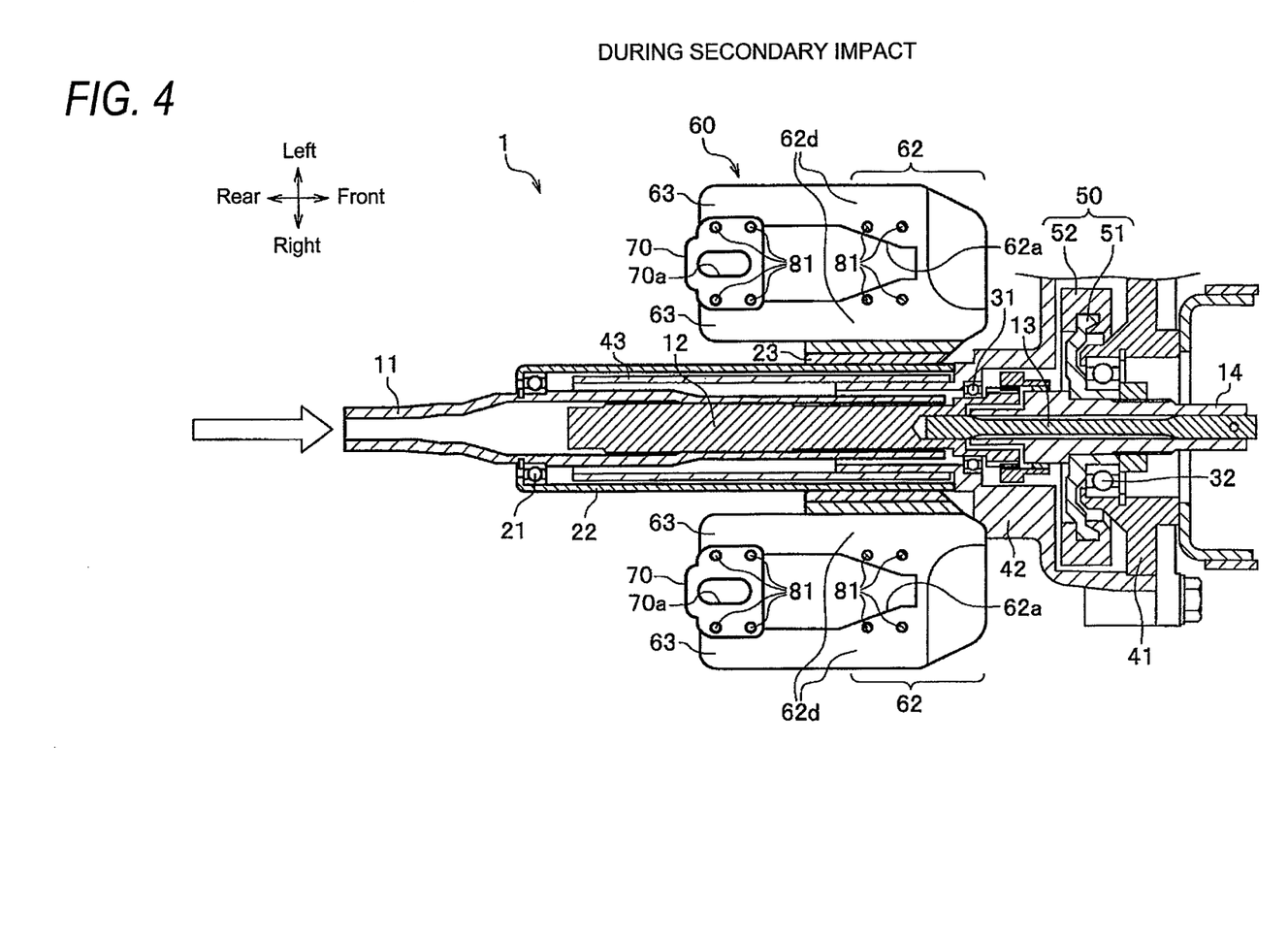
FIG. 4 is a plan cross-sectional view of the steering apparatus according to the present embodiment, showing the secondary collision state.
Figure 5:
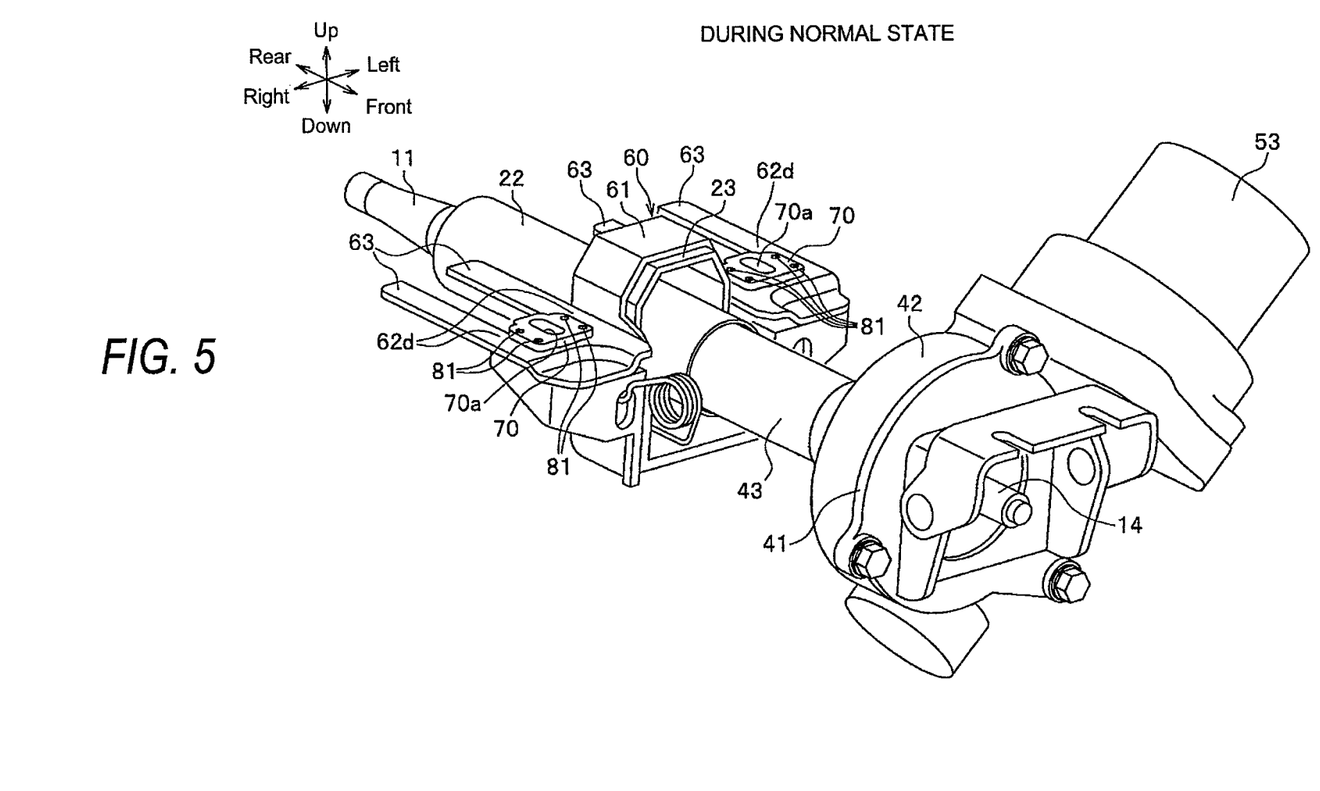
FIG. 5 is a perspective view of the steering apparatus according to the present embodiment as seen from right forward, the view showing the normal state.
Figure 6:
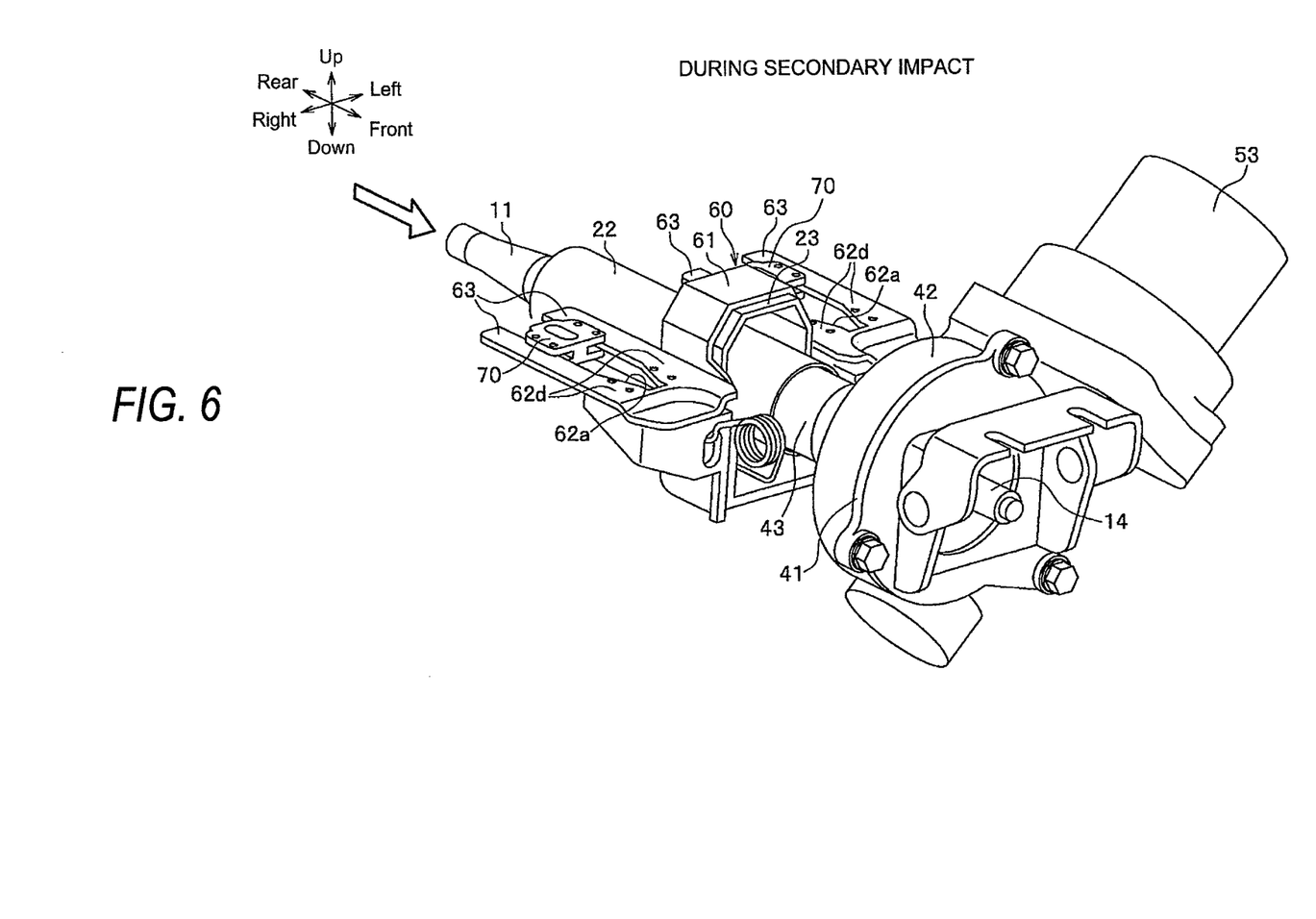
FIG. 6 is a perspective view of the steering apparatus according to the present embodiment as seen from right forward, the view showing the secondary collision state.
Figures 7A, 7B:
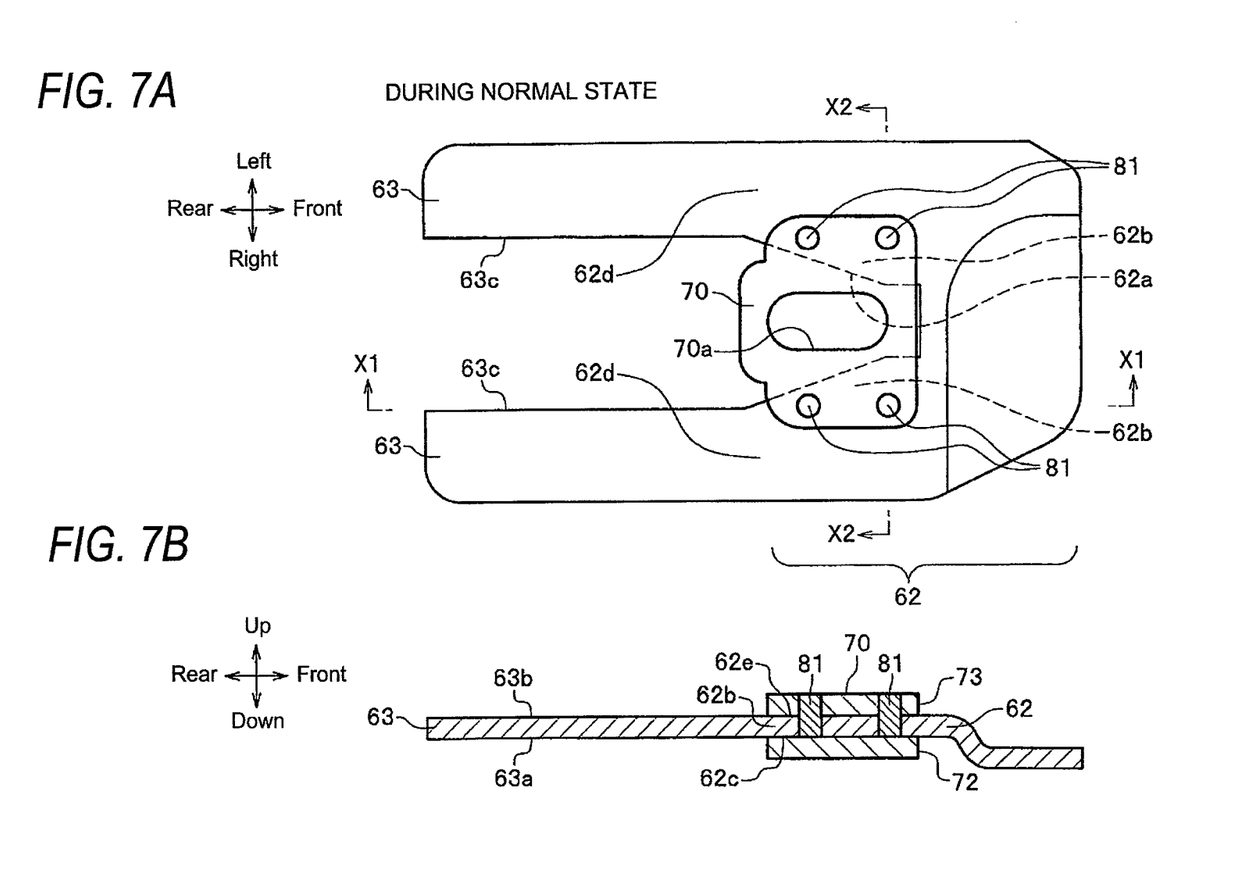

Furthermore, four through-holes 73a are formed in the second locking portion 73 (see FIG. 8B). Four resin pins 81 (resin injections) are provided so as to penetrate the second locking portion 73 of the fixation piece 70 and the flange portion 62 during the normal state as shown in FIG. 7A and FIG. 7B. The four pins 81 position the fixation piece 70 and the bracket 60 in the axial direction.

Figure 8C:
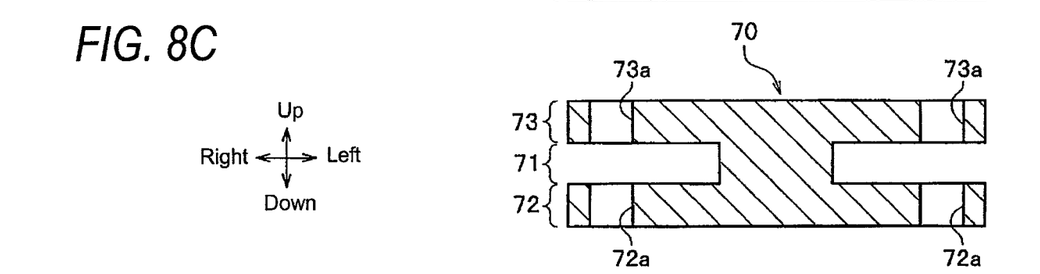

Alternatively, as shown in FIG. 8C, four through-holes 72a may also be formed in the first locking portion 72 so that the pins 81 penetrate the second locking portion 73, the flange portion 62, and the first locking portion 72. The number, diameter, and material of pins 81, and a method for fixing the pins 81 may be varied as appropriate.

<Effects of the Steering Apparatus>

The above-described steering apparatus 1 exerts the following effects.

<During the Normal State>

The first locking portion 72 and the second, locking portion 73 sandwich the flange portion 62, thus restraining the flange portion 62 (bracket 60) in the up-down direction even if the steering apparatus 1 vibrates up and down as a result of travel of the vehicle.

<During a Secondary Collision>

Figure 10:
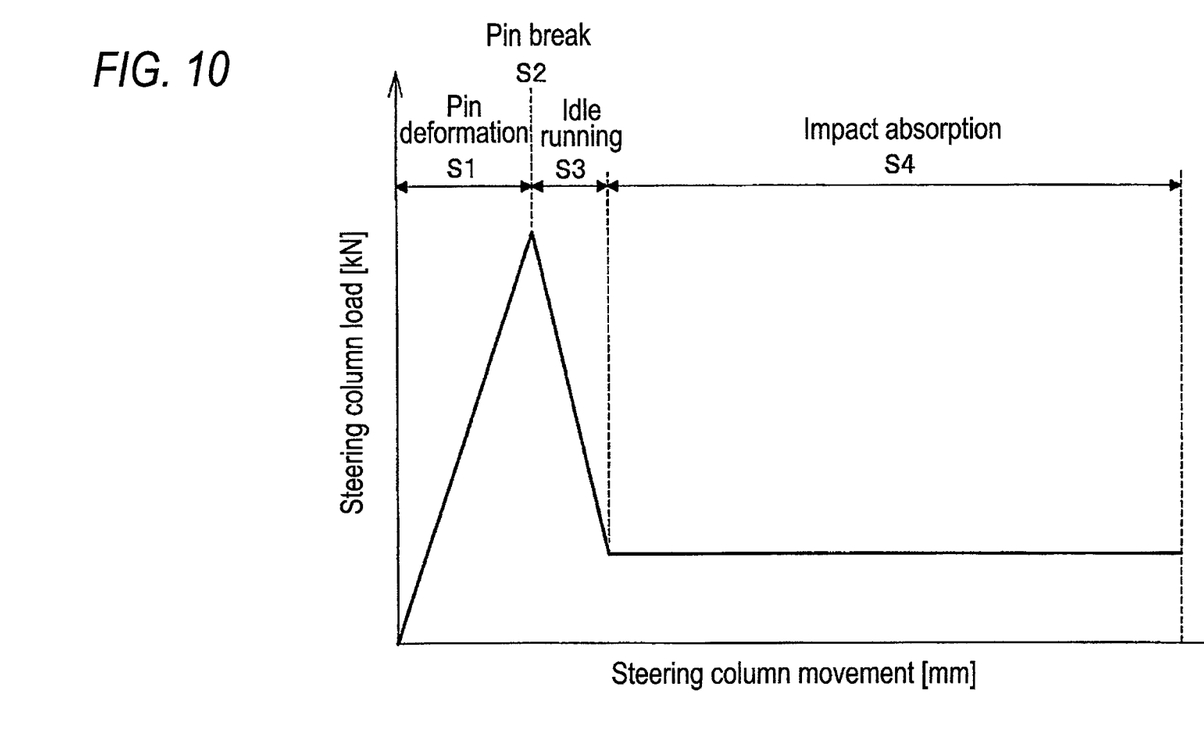
FIG. 10 is graph showing an effect of the steering apparatus according to the present embodiment.

During a secondary collision, that is, after a front collision of the vehicle (primary collision), when the driver collides against the steering wheel (secondary collision), a forward load input to the steering wheel, the steering column 11, the outer pipe 22, and the bracket 60 increases to deform the resin pins 81 (see a section S1 in FIG. 10).

Subsequently, when the forward load reaches a predetermined value, the pins 81 are broken (see a breaking point S2 in FIG. 10) and the fixation piece 70 is detached from the locking hole 62a. The steering wheel, the steering column 11, the outer pipe 22, and the bracket 60 slide integrally forward, that is, run idly (see a section S3 in FIG. 10).

In this case, after the fixation piece 70 is detached from the locking hole 62a, the first locking portion 72 of the fixation piece 70 supports the lower surfaces 63a of the guided portions 63 while in sliding contact with the lower surfaces 63a (see FIG. 9B), thus preventing the steering wheel, the steering column 11, the outer pipe 22, and the bracket 60 from falling down. This in turn prevents the driver's legs from being injured by the steering wheel or the like.

Furthermore, the steering column 11 and the like slide forward without being tilted, thus preventing a forward secondary collision load input to the steering column 11 and the like from varying during the slide (see a section S4 in FIG. 10). Thus, the secondary collision load can be appropriately absorbed by an appropriate impact absorption structure.

<Other Effects>

The pair of guided portions 63 is a part of the bracket 60 and is not a component separate from the bracket 60 or an independent dedicated component. This prevents a possible increase in the number of components of the steering apparatus 1 and in the number of assembly steps for the steering apparatus 1.

<<Variation>>

The embodiment of the present invention has been described. However, the present invention is not limited to the embodiment. For example, the embodiment may be varied as follows.

Figure 11:
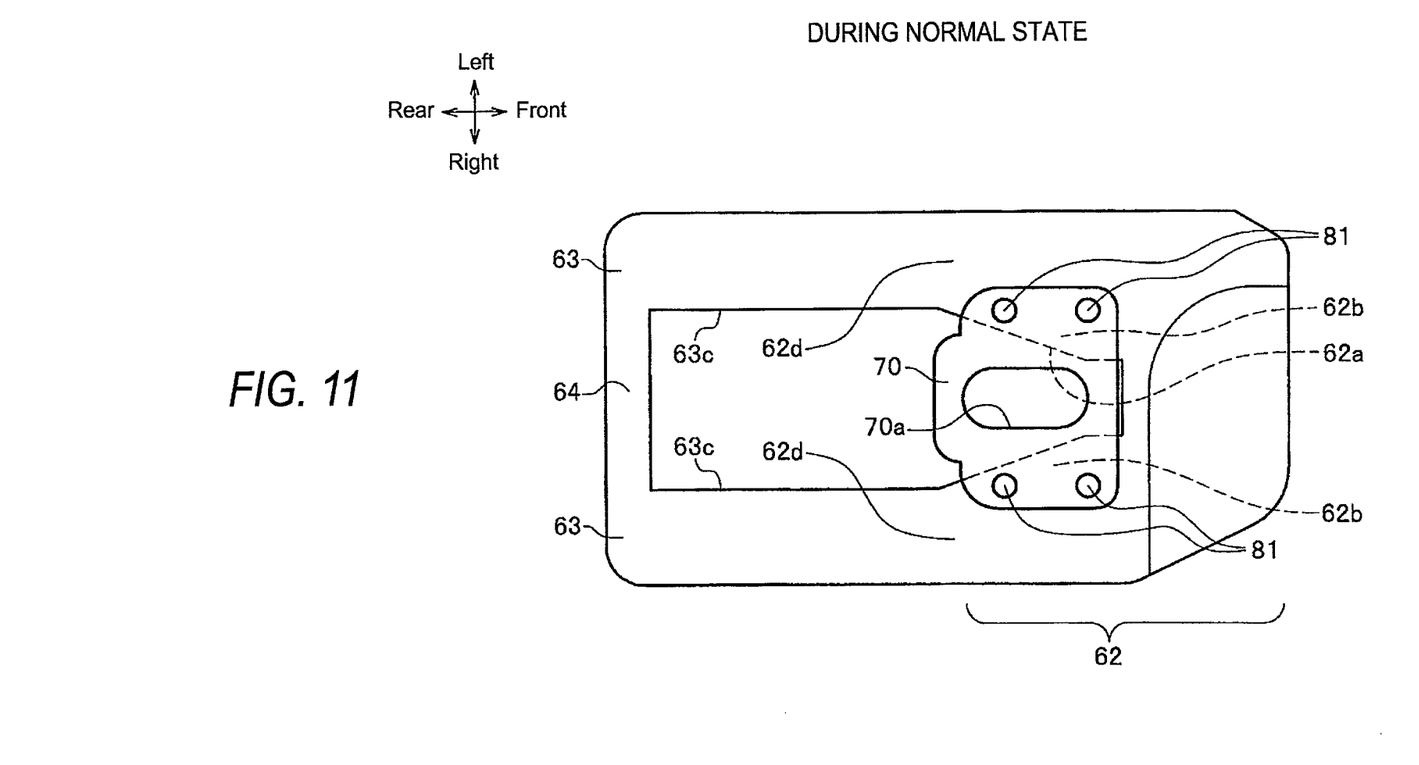
FIG. 11 is an enlarged plan view of a steering apparatus according to a variation during the normal state.

As shown in FIG. 11, the bracket 60 may include a coupling portion 64 that couples rear sides (steering wheel sides) of the pair of guided portions 63 together. In such a configuration, the coupling portion 64 abuts against the fixation piece 70 and functions as a stopper. This prevents the bracket 60 from being separated from the fixation piece 70.

Figure 12:
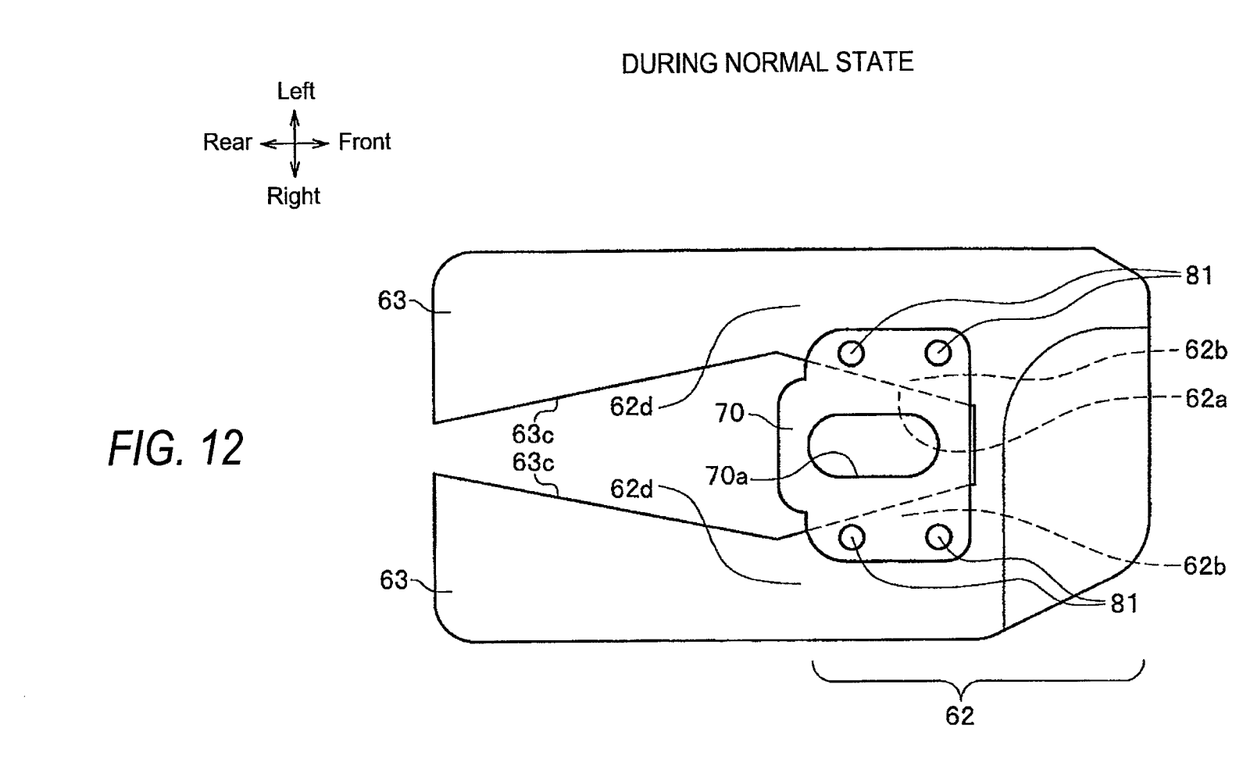
FIG. 12 is an enlarged plan view of a steering apparatus according to a variation during the normal state.

As shown in FIG. 12, a guided surface 63c of each guided portion 63 may be inclined so as to have a guide width gradually decreasing toward the rear side so that the distance between the pair of guided portions 63 may gradually decrease toward the steering wheel. In such a configuration, during a secondary collision, if the bracket 60 moves forward, a frictional force exerted between the fixation piece 70 and the pair of guided portions 63 increases to allow a load input to the bracket 60 as a result of a secondary collision to be appropriately attenuated.

In the above-described embodiment, the steering apparatus 1 is of the column assist type by way of example. Alternatively, the steering apparatus 1 may be, for example, a manual steering column without an assist function which is included in a system of a pinion assist type or a rack assist type.

What is claimed is:
1. A steering apparatus comprising:
a steering column extending forward from a steering wheel operated by a driver, and rotating integrally with the steering wheel;
a bracket supporting the steering column via a bearing in such a manner that the steering column is rotatable, the bracket being in a relative positional relation with the steering column in an axial direction; and
a fixation portion fixed to a vehicle body, wherein the bracket has a locking hole which penetrates the bracket in an up-down direction and is open on a steering wheel side, the fixation portion inserted through the locking hole, during a normal state, is locked on a lower surface of an edge portion of the bracket, enclosing the locking hole thereby locking the bracket to the fixation portion, the bracket includes a pair of flange portions provided at a side of the bracket opposite from the steering wheel and a pair of guided portions extending from each of the flange portions toward the steering wheel, each of said guided portions having a same axial length, during a secondary collision, the bracket moves forward to detach the fixation portion from the locking hole, and then, the fixation portion is locked on lower surfaces of the pair of guided portions, while the fixation portion guides the pair of guided portions in the axial direction, and the axial length of the guided portion is greater than a length in which the steering column moves during the secondary collision such that the bracket is prevented from falling down from the fixation portion.

2. The steering apparatus according to claim 1, wherein a distance between the pair of guided portions decreases gradually toward the steering wheel.

3. The steering apparatus according to claim 1, wherein a width of the locking hole in a direction perpendicular to the axis gradually increases toward the steering wheel.

* * * * *